United States Patent [19]
Johnson et al.

[11] Patent Number: 6,067,927
[45] Date of Patent: May 30, 2000

[54] VISUAL INDICATOR

[76] Inventors: Lenard W. Johnson; Thomas C. Johnson, both of HCR-3 Box 6A, Roseau, Minn. 56751

[21] Appl. No.: 08/941,797

[22] Filed: Sep. 30, 1997

[51] Int. Cl.⁷ .................................................. G01F 23/00
[52] U.S. Cl. ...................... 116/227; 116/284; 116/299; 73/290 R
[58] Field of Search ................... 116/227, 229, 116/264, 266, 270, 271, 273, 274, 275, 284, 299, 303, 110, 228, 109; 73/290 R, 296, 317, 305, DIG. 5; 141/94, 95; 340/618, 625, 612, 615, 623

[56] References Cited

U.S. PATENT DOCUMENTS

| | | | |
|---|---|---|---|
| 910,606 | 1/1909 | Swanson | 73/290 R |
| 943,868 | 12/1909 | Garlick | 116/229 |
| 1,854,266 | 4/1932 | Lundquist | 116/229 |
| 3,290,938 | 12/1966 | Miller . | |
| 3,401,562 | 9/1968 | Reaney . | |
| 3,685,356 | 8/1972 | Zimmerman | 73/290 R |
| 4,043,199 | 8/1977 | Greer . | |
| 4,627,378 | 12/1986 | Manness et al. | 116/229 |
| 4,790,184 | 12/1988 | Nakanishi | 116/229 |
| 4,799,383 | 1/1989 | Johnson et al. . | |
| 4,829,820 | 5/1989 | Johnson et al. . | |
| 5,088,323 | 2/1992 | Johnson et al. . | |
| 5,374,790 | 12/1994 | Horvath | 73/313 |
| 5,425,271 | 6/1995 | Duksa | 116/229 |
| 5,425,329 | 6/1995 | Pollock | 116/227 |

*Primary Examiner*—Andrew H. Hirshfeld
*Attorney, Agent, or Firm*—Burd, Bartz & Gutenkauf

[57] ABSTRACT

An indicator providing visual information of the level of bulk material in a bin has rotatable visual members with bright and dark colored surfaces covered with a transparent lens. A actuator located within the bin is operatively coupled to the visual members to turn the visual member to an ON position exposing the bright colored surface to a person when bulk material engages the actuator and to an OFF position exposing the dark colored surface to a person when the actuator is free of bulk material whereby the person can determine the level of the bulk material in the bin. The visual members are also provided with a device that triggers a sensor that activates a remote indicator providing data as to the level of bulk material in the bin.

35 Claims, 9 Drawing Sheets

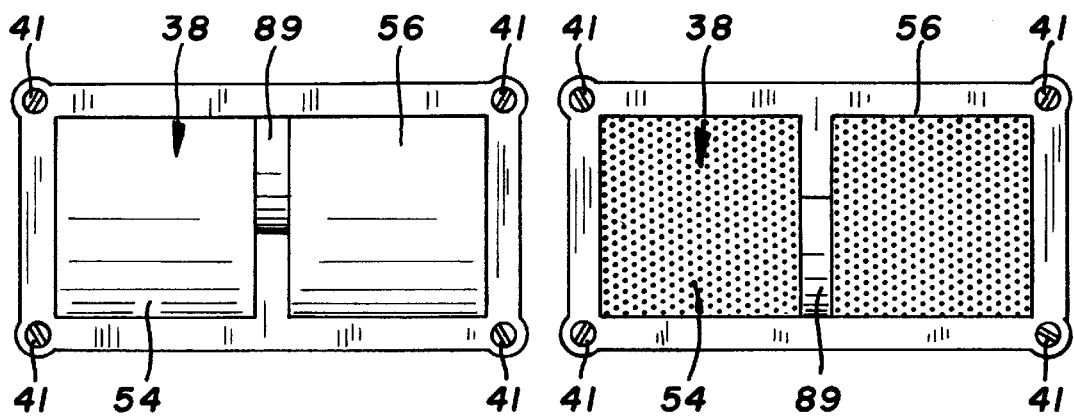
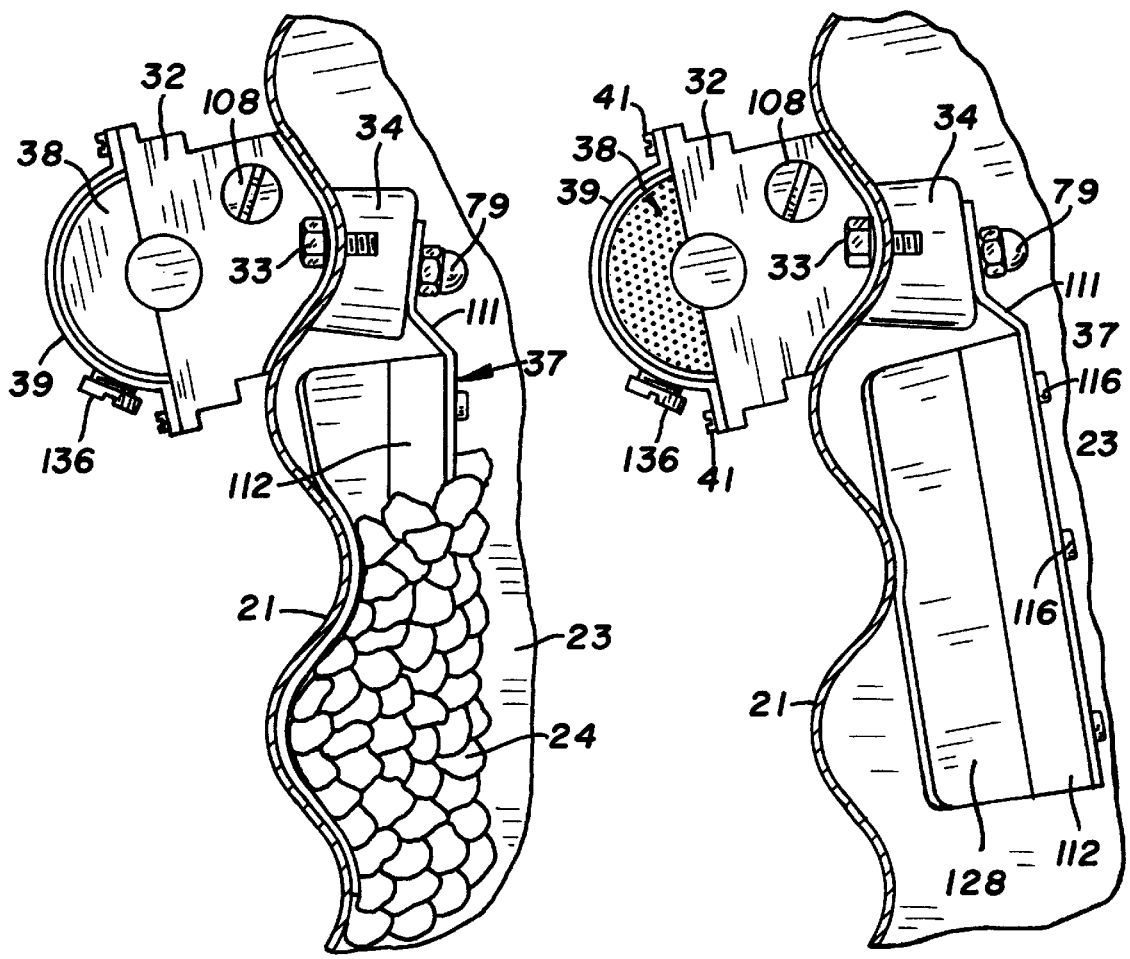

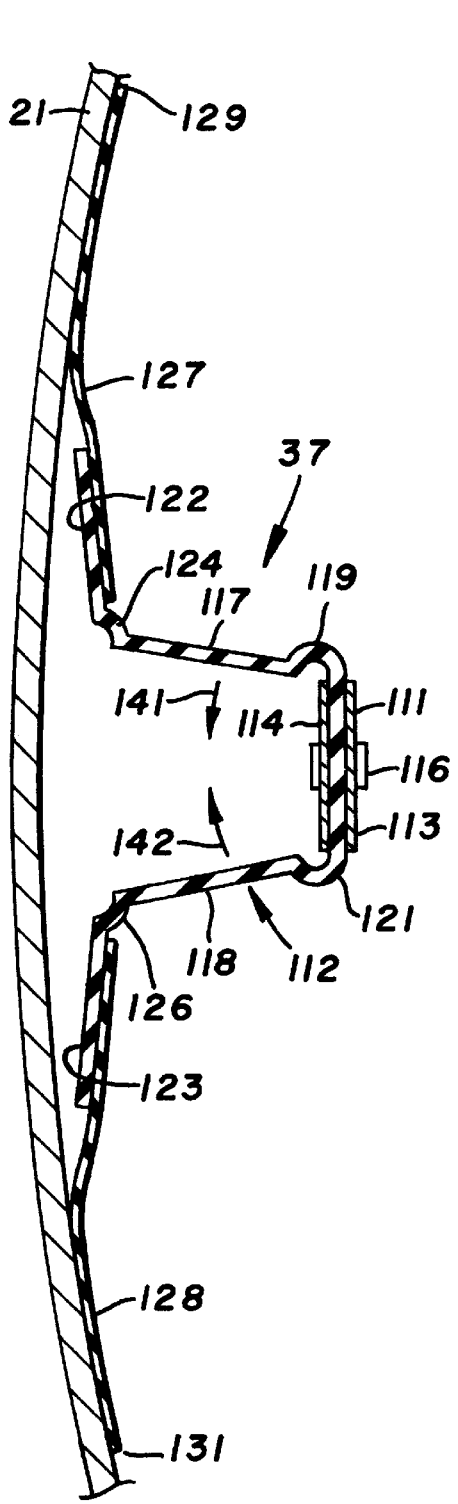
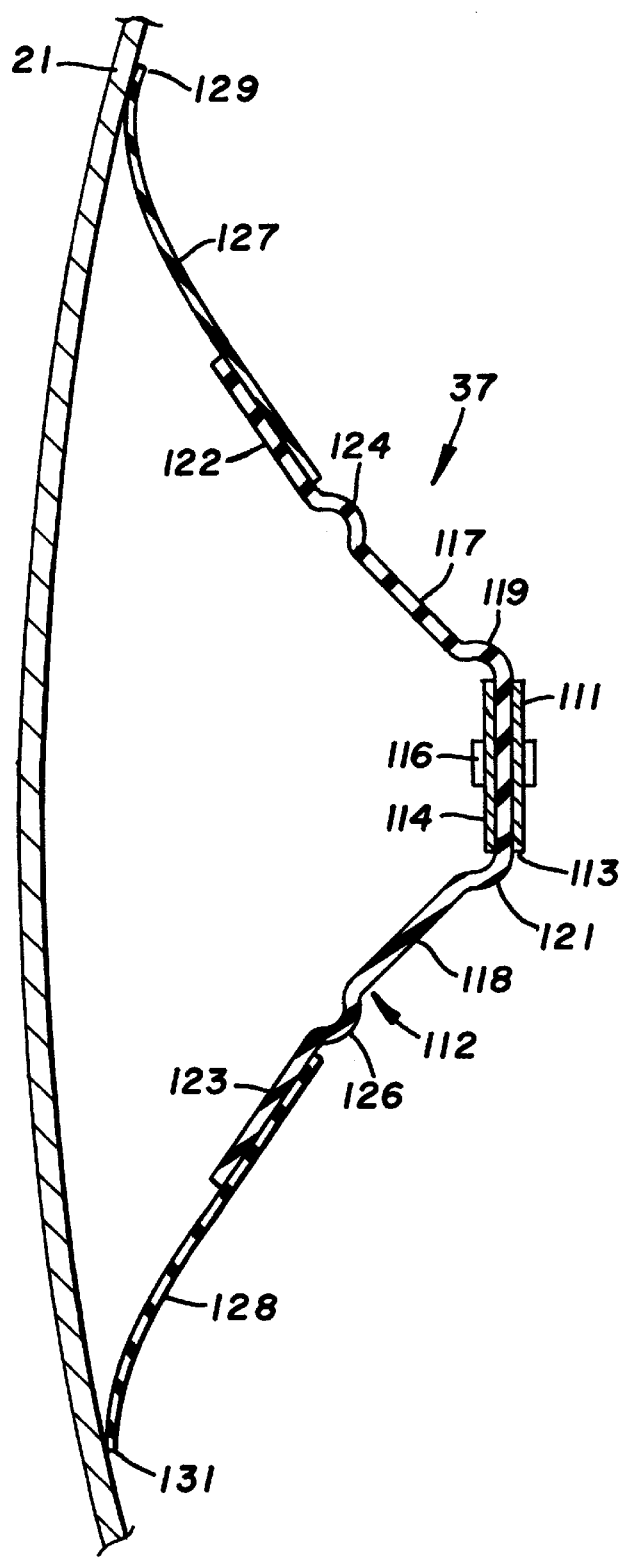
*FIG.15*  *FIG.16*

VISUAL INDICATOR

FIELD OF THE INVENTION

The present invention relates to indicators for providing a positive visual indication of the presence of pressure, or lack thereof, exerted by a media stored in, or flowing thru, a container, bin, vessel, chamber and the like. The indicator also includes various actuators which are used to activate the indicator to indicate level of granular bulk solids held within a container, to indicate liquid levels contained within a vessel, to indicate a reticular amount of airflow passing thru a ventilation chamber, or any use where a certain ON/OFF indication is needed by the user. The indicator also includes provisions to adapt an optional electrical sensor to the indicator that is used to provide an electrical signal referencing the position of the indicator and relaying this information to activate or deactivate other electrical equipment such as electrical motors, sound horns or hook to computerized inventory control systems.

BACKGROUND OF THE INVENTION

Visual indicators operable to provide a person with information concerning the level of bulk materials in bins and tanks are known in the art. L. W. Johnson and T. C. Johnson in U.S. Pat. Nos. 4,799,383; 4,829,820; and 5,088,323 disclose visual indicators that provide positive ON and OFF visual information of the level of granular or liquid materials stored in bins, tanks, and containers.

SUMMARY OF THE INVENTION

The present invention comprises an indicator operable to provide positive visual indication of the level of bulk material in a structure storing the bulk material. The indicator is also useable in combination with a sensor to provide data to a remote location relating to the level of bulk material in the structure. The indicator is operable to sense the level of a large number granular bulk solids ranging from powders to pellets including agricultural grains and feeds, plastic pellets, fertilizer, salt, minerals, cement powders and sand. The level of a liquid in a tank or container can be determined with an indicator of the invention. The indicator senses the presence of a media pressure or lack of media pressure in a chamber or passage accommodating the media. The media can be granular solids, semi-solids, liquid or a gas, such as air. The indicator has a body supporting rotatable visual members having contrasting colored portions enclosed with a transparent lens. The body is mounted in a select location on a side wall of a bin for storing bulk materials. An actuator located within the bin is operatively connected to the visual members to move the visual members between ON and OFF positions. Bulk materials in the bin move and retain the actuator in a first location adjacent the side wall of the bin. When actuator is in it's first location the visual members are in the ON position with bright color portions of the visual members located adjacent the transparent lens which provides a visual indication of the level of bulk materials in the bin. When the actuator is free of bulk materials it moves from the first location to a second location causing the visual members to move to the OFF position wherein the dark portions of the visual members are adjacent the transparent lens.

The preferred embodiment of the indicator has a body having a support extended through a hole in the side wall of a bin for storing bulk materials. A flexible rubber boot surrounds the support and engages the side wall of the bin around the hole. Self tapping screw fasteners secure the body to the side wall of the bin. Optional nut and bolt fasteners clamp the boot to the bin side wall and secure the body to the bin side wall in applications where a corrosive media, such as salt, fertilizer, or other granular chemicals, is stored in the bin. The visual members are cylindrical members rotatably mounted on a rod mounted on the body. A transparent lens attached to the body covers the cylindrical members to prevent dirt, water, snow and foreign materials from contaminating the visual members and inside of the lens. Each cylindrical member has an outer surface. One half of the outer surface supports a bright color tape, such as a yellow or white reflective tape. The remaining half of the outer surface is a dark color, such as black. The cylindrical members rotate about 180 degrees between ON and OFF positions. When the cylindrical members are in the ON position, the bright color tape is adjacent the lens providing a visual indication of the level of bulk materials in the bin. Movement of the cylindrical members to the OFF position locates the dark color of the cylindrical members adjacent the lens providing visual information that the level of bulk materials in the bin is below the indicator. The cylindrical members are rotated in response to movement of an actuator located with the bin. The actuator is secured to an arm movably mounted on the support. The arm projects outwardly from the support to a gear drive coupled to the arm and cylindrical members. The gear drive comprises a motion transmitting mechanism having generally linear gear teeth or a rack connected to the arm and a spur gear or pinion attached to the cylindrical members operable to rotate the cylindrical members between ON and OFF positions. The actuator has a spring bar attached to the arm and a flexible body secured to the bar. The body and bar are rolled into a generally cylindrical configuration and inserted from the outside of the bin through the hole in the bin side wall. The entire actuator is mounted on the bin from the outside of the bin. The body is a flexible member with outer edges that engage the inside of the bin side wall in both the ON and OFF positions of the visual members. The body prevents bulk material from collecting behind the actuator whereby the actuator is moved by pressure of bulk material in the bin to its first position adjacent the bin side wall. A spring mounted on the body engages the arm to bias the arm down and the actuator to it's second position. The spring also biases the visual members to the OFF position. The tension of the spring is adjustable with a thumb screw and nut assembly mounted on the body to compensate for different types of bulk materials.

A modification of the indicator includes a sensor connected to the lens leading to a remote indicator system which provides information concerning ON and OFF conditions of the actuator. The sensor is a switch trigger with a magnet or metallic strip mounted on a cylindrical member. When the cylindrical member is in the OFF position, the magnet is adjacent sensor and activates the sensor which provides information to the remote indicator system of the level of bulk material in the bin. The electrical components of the sensor are located on the outside of the bin side wall without any direct contact with the bulk material in the bin.

Several indicators are installed on a bin at levels wherever the user needs a reference of the amount of material in the bin. Each indicator provides a reference to a single particular level of material in the bin. In some installations a single indicator is used to provide the user with information of a particular level of material in a bin. The indicators can be installed on a wide variety of bin styles and shapes including bins having either corrugated of flat bin walls. The installation is accomplished entirely from the outside of the bin through a hole in the bin side wall for each indicator. After the indicator is inserted through the hole, the indicator is firmly secured to the bin wall by the self tapping screw fasteners or nut and bolt fasteners. As the indicator is drawn tight to the bin side wall, a weatherproof seal is created between the boot and bin side wall to help prevent rain, snow and other harmful elements from contaminating stored materials, sometimes dangerous to the environment, form escaping from said bin. All of the parts moved by the actuator are enclosed within the body, lens and boot and sealed from the bulk material in the bin and the outside environment.

DESCRIPTION OF DRAWING

FIG. 5 is a front elevational view of the outside of the indicator in the ON position;

FIG. 6 is a side elevational view of the indicator in the ON position mounted on the side wall of the bin;

FIG. 7 is a front elevational view of the outside of the indicator in the OFF position;

FIG. 8 is a side elevational view of the indicator in the OFF position mounted on the side all of the bin;

FIG. 15 is a sectional view taken along the line 15—15 of FIG. 9;

FIG. 16 is a sectional view taken along the line 16—16 of FIG. 11;

DETAILED DESCRIPTION OF THE PREFERRED EMBODIMENTS

Figure 1:
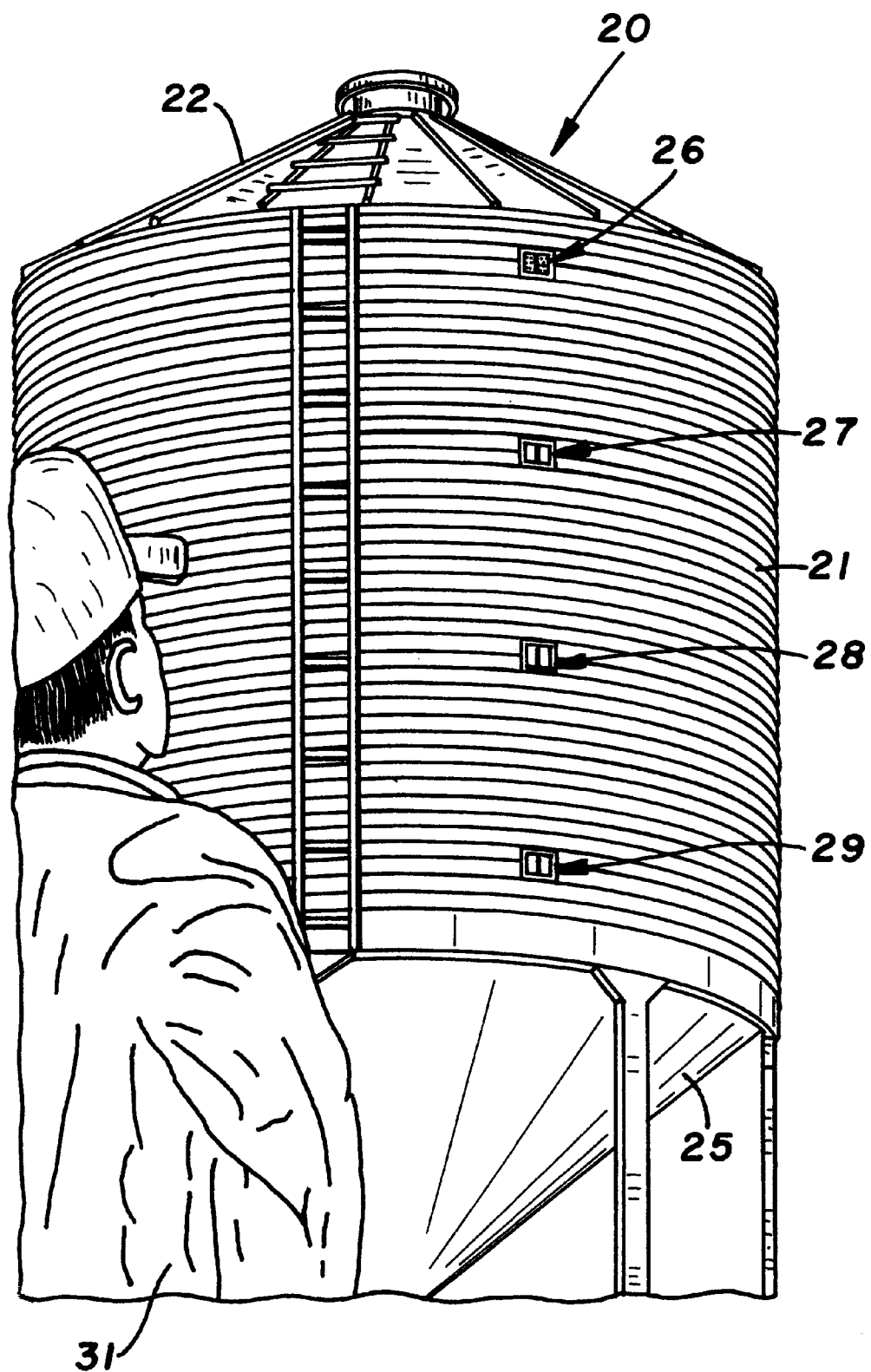
FIG. 1 is a perspective view of a grain bin having four grain level indicators or the invention mounted on the side wall of the bin.
Figure 2:
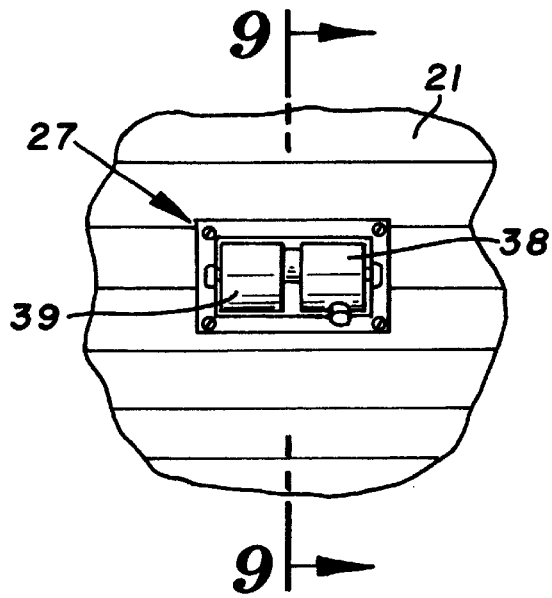
FIG. 2 is an enlarged front elevational view of one indicator of FIG. 1.
Figure 3:
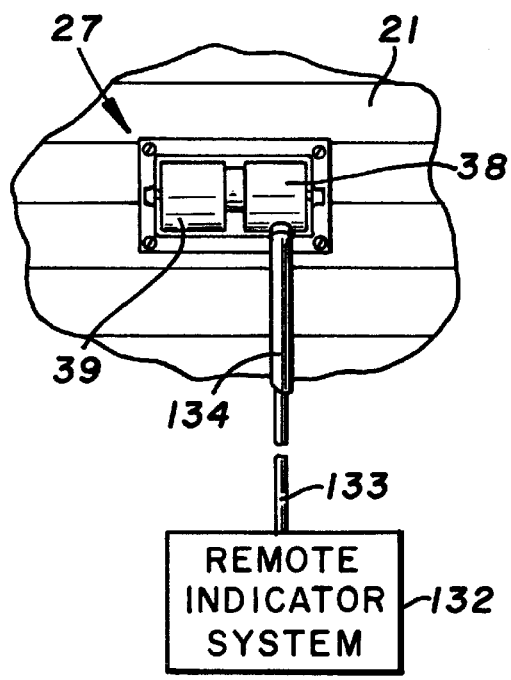
FIG. 3 is a front elevational view of an indicator coupled to a remote indicator system that provides data or signals related to the level of grain in the bin.
Figure 4:
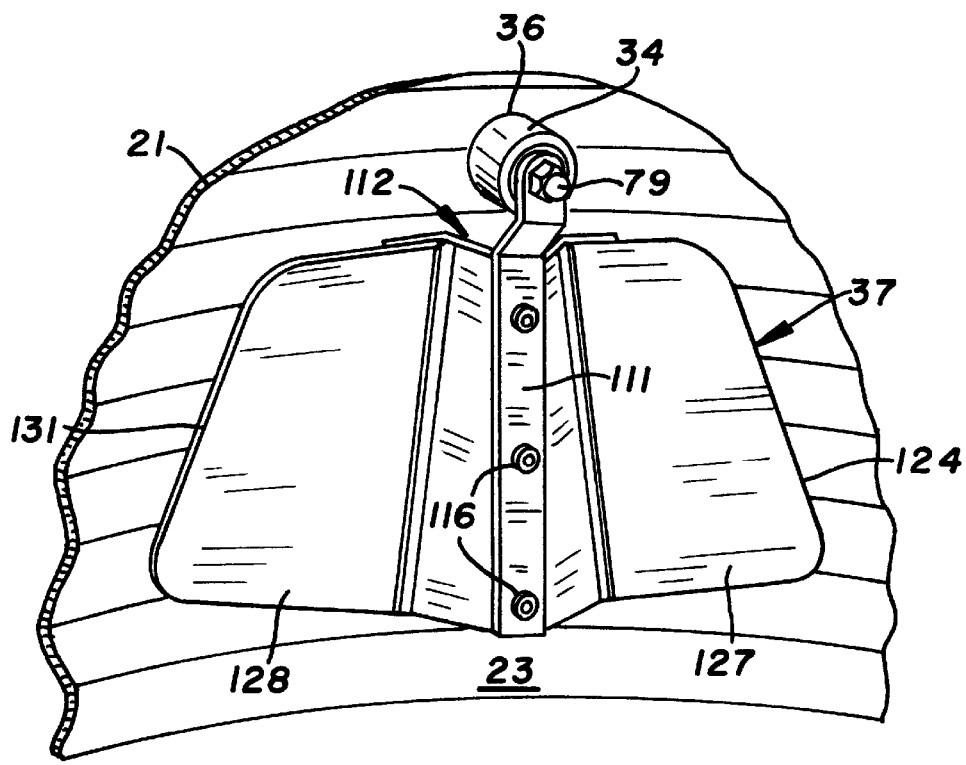
FIG. 4 is a perspective view of the actuator of the indicator on the inside of the bin.

Referring to FIG. 1 of the drawing there is shown a material storage structure indicated generally at 20 for holding grain, feed, granular fertilizer, and particulate materials, such as plastic pellets, mineral, cement powders and sand. These materials are herein identified as bulk materials. Structure 20 is an upright cylindrical structure having a side wall 21, a roof 22 and bottom 25 defining an internal chamber 23 accommodating bulk material 24. Side wall 21 can be corrugated or smooth. Structure 20 is shown as a hopper bin with a cone shaped bottom 25 having an outlet to remove material from the bin. Structure 20 can be a silo, tank or container for storing particulate materials, semi-solids, liquids and gases.

Indicators 26, 27 28 and 29 mounted on side wall 21 at vertically spaced positions provide visual information as to the level of bulk material in bin chamber 23 to a person 31. Each indicator 26–29 provides positive ON or OFF visual information of the presence of bulk material adjacent the indicator which indicates the amount of bulk material in the bin chamber 23. Indicator 26 is in the OFF position. Indicators 27–29 are in the ON position. Person 31 viewing indicators 26–29 from a distance is informed that the level of bulk material in bin chamber 23 is between indicators 26 and 27.

Indicators 26–29 are identical in structure and function. The following description is directed to indicator 27 shown in FIG. 2 to 20. As shown in FIGS. 5 and 6, indicator 27 has a housing or body 32 attached to side wall 21 with bolts 33. A cup-shaped flexible rubber boot 34 extends through a hole 36 in side wall 21 and projects into bin chamber 23. An actuator 37 extends downward from the inner end of boot 34. Actuator 37 is operatively connected to visual members 38 to move visual members 38 between ON and OFF positions. Visual members 38 are located under a transparent lens or cover 39 mounted on body 32 with bolts 41. As shown in FIGS. 6 and 8, visual members 38 are color coded to provide visual information of the ON and OFF positions of the indicator 27. When indicator 27 is in the ON position, shown in FIGS. 5 and 6, visual members 38 show a bright color, such as yellow or white, adjacent lens 39 which is visible to person 31. Actuator 37 is adjacent side wall 21 due to the presence of bulk material 24. When indicator 27 is in the OFF position, shown in FIGS. 7 and 8, visual members 38 show a dark color, such as blue or black, adjacent lens 39 which is also visible to person 31. The differences in color of visual members 38 provide person 31 with information concerning the level of the bulk material in bin chamber 23. When the bright color of visual members 38 is observed the level of the bulk material in bin chamber 23 is at or above actuator 27. When the dark color of visual members 38 is observed in the level of the bulk material in bin chamber 23 is below actuator 27.

Figures 9, 10:
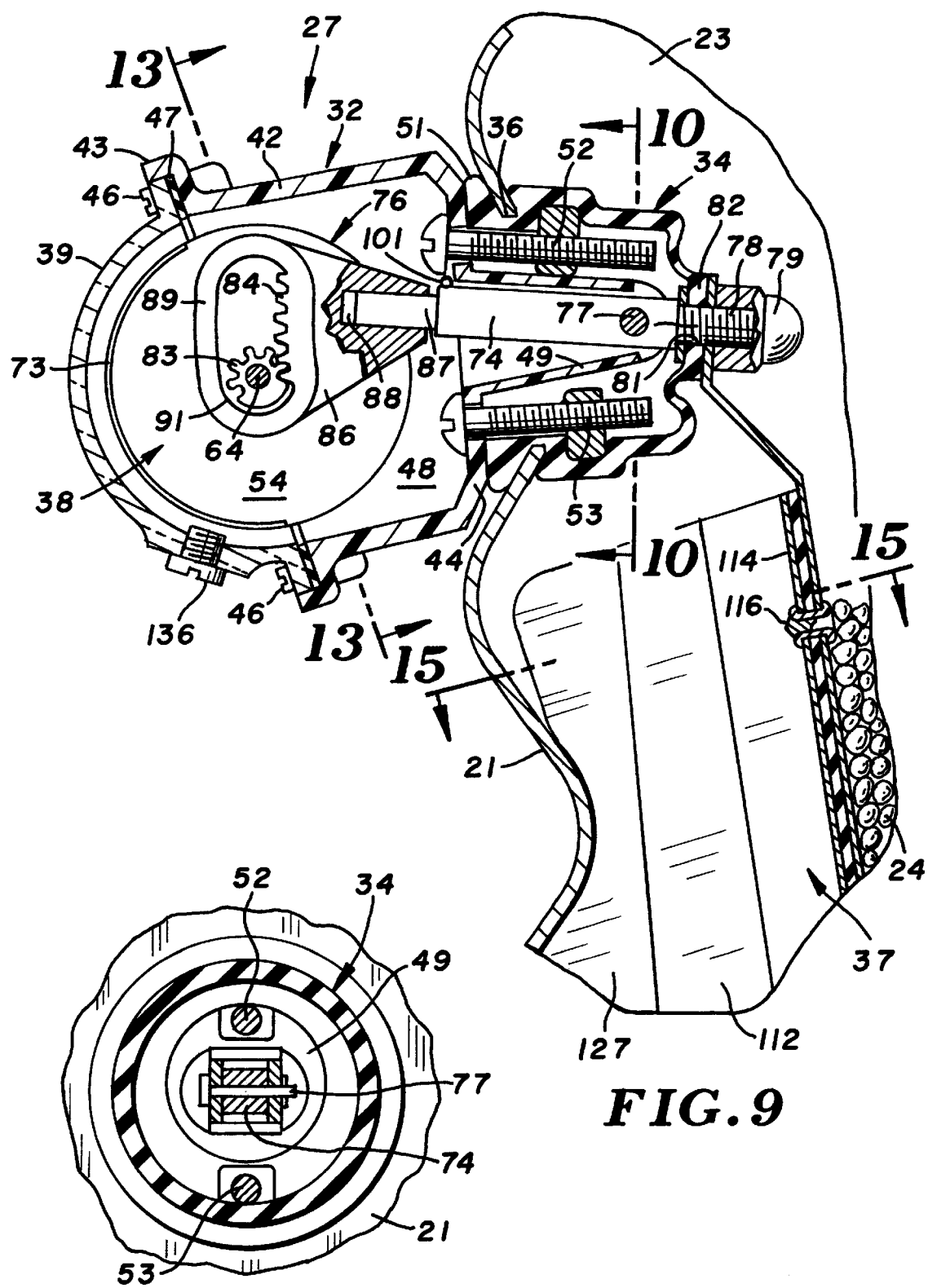
FIG. 9 is an enlarged sectional view taken along line 9—9 of FIG. 2 of the indicator in the ON position.
FIG. 10 is a sectional view taken along line 10—10 of FIG. 9.
Figure 11:
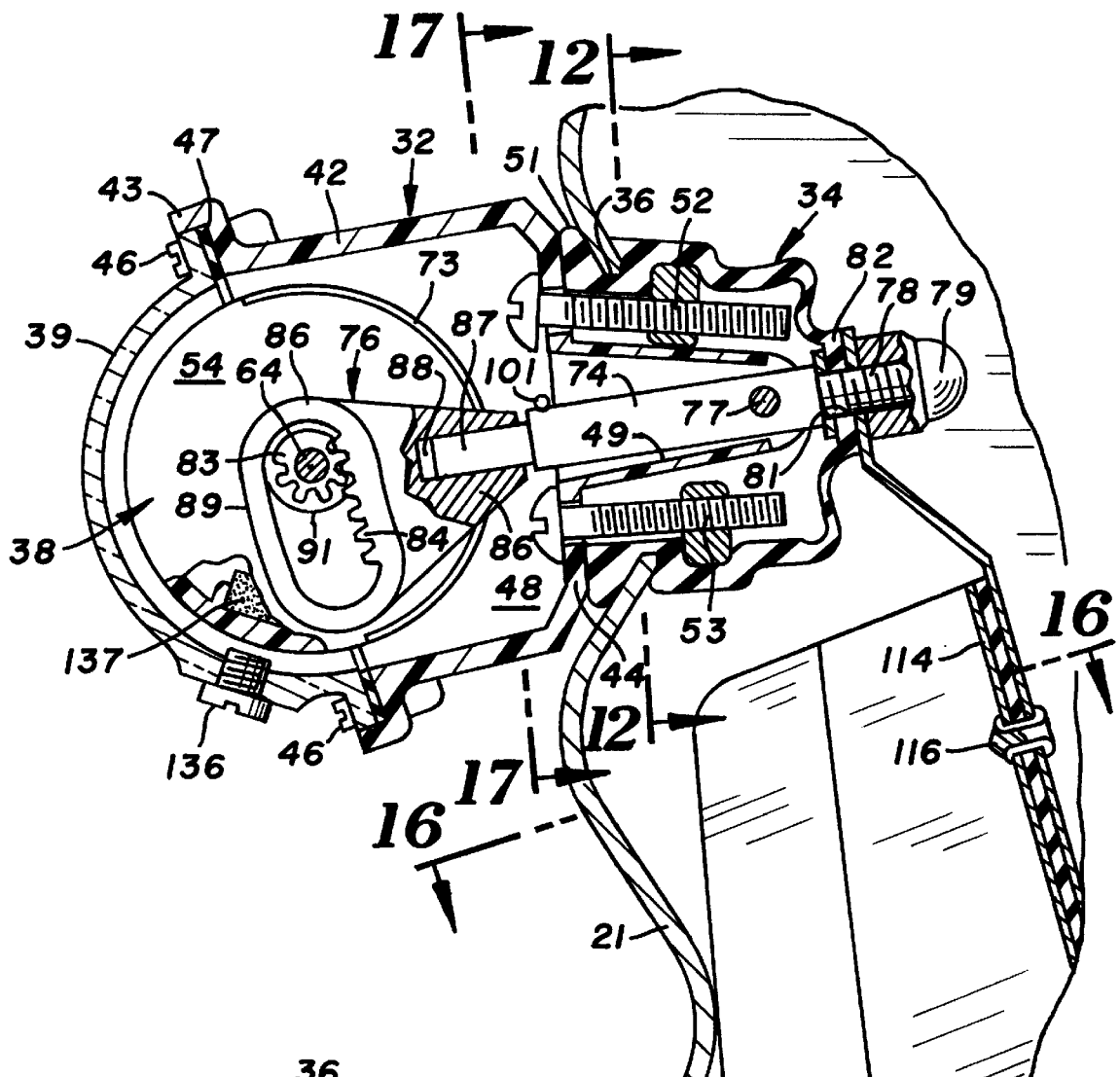
FIG. 11 is an enlarged sectional view similar to FIG. 9 of the indicator in the OFF position.
Figure 12:
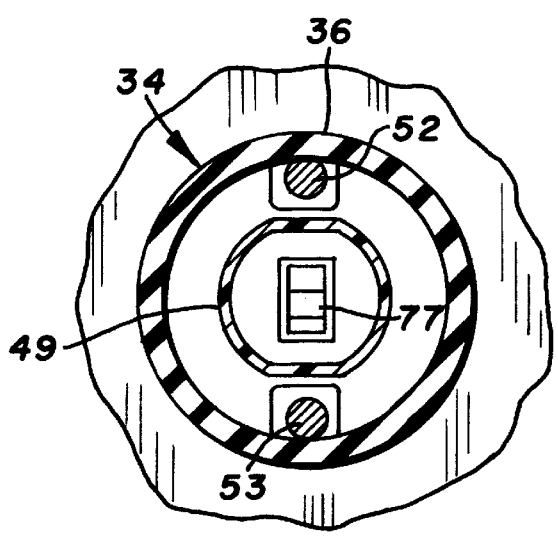
FIG. 12 is a sectional view taken along line 12—12 of FIG. 11.
Figure 17:
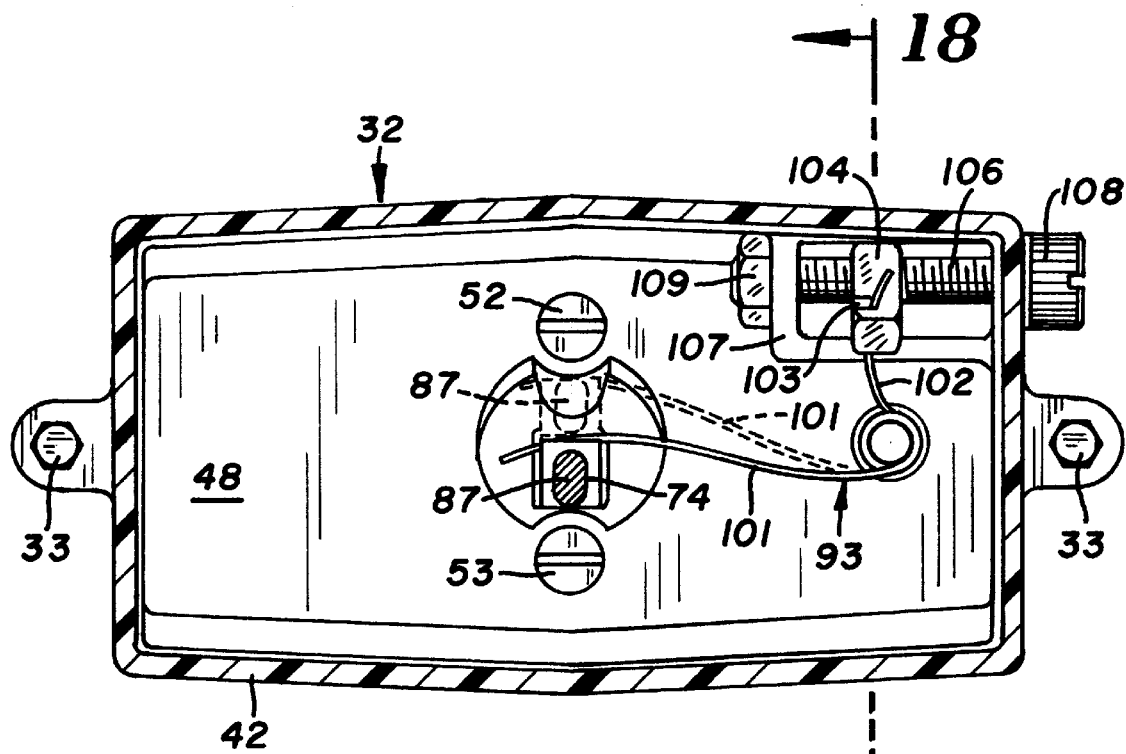
FIG. 17 is a sectional view taken along the line 17—17 of FIG. 11.

As shown in FIGS. 9, 11 and 17, body 32 has a rectangular side wall 42 joined to an outwardly projected peripheral stepped lip 43 and a back wall 44. Lens 39 is a semi-cylindrical transparent plastic member secured to lip 43 with bolts 46. A gasket 47 is interposed between lens 39 and lip 43 to prevent water, snow, dust and other materials from entering the actuator chamber 48 containing visual members 38.

A cone shaped member or support 49 joined to back wall 44 extends through hole 36 in side wall 21. Boot 34 surrounds support 49. The outer end of boot 34 has an outwardly directed flange 51 located between back wall 44 of body 32 and side wall 21. A pair of nut and bolt assemblies 52 and 53 clamp boot 34 and back wall 44 to bin side wall 21. Boot 34 has an outside diameter larger than the diameter of hole 36 whereby the boot is in tight sealing relation with bin side wall 21. The nuts of nut and bolt assemblies 52 and 53 engage inside portions of boot 34 and hold the boot against the inside of bin wall 21.

Figure 13:
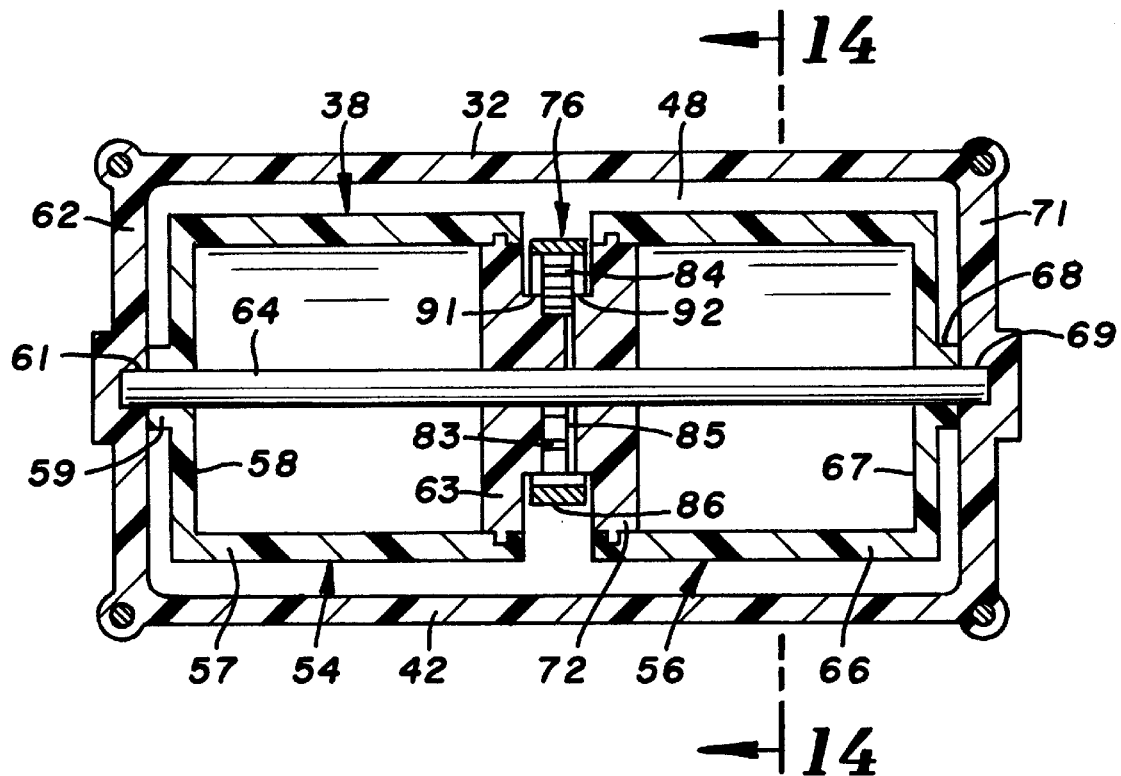
FIG. 13 is a sectional view taken along line 13—13 of FIG.

Visual members 38, shown in FIG. 13, comprise a pair of cylindrical or cup members 54 and 56 located in chamber 48 adjacent lens 39. Cup member 54 has a cylindrical outside wall 57 joined to an end wall 58 having a short cylindrical boss 59. Boss 59 engages the inside of wall 62. End wall 58 and boss 59 have a hole accommodating a cylindrical rod 64. The left end of rod 64 projects into a pocket 61 in the middle of end wall 62 of body 32 to support rod 64 on wall 62. A plug or disk 63 attached to the inner end of cylindrical wall 57 accommodates rod 64. Cup member 54 and disk 63 rotate on rod 64. Cup member 56 is axially aligned with cup member 56 and has a cylindrical wall 66 joined to an end wall 67 having a short cylindrical boss 68. Boss 68 engages the inside of end wall 71. The right end of rod 64 projects into a pocket 69 in the middle of end wall 71 of body 32 to support rod 64 on wall 71. A disk 72 attached to the inner end of cylindrical wall 66 is rotatably mounted on rod 64. The outer right end of shaft 64 extends through boss 68 into pocket 69. Cup members 54 and 56 are free to rotate about the axis of rod 64.

Cup members 54 and 56 are dark plastic members such as black polyethylene. A bright color, such as yellow or white, tape 73 is secured to one half of the outer surface of each cylindrical wall 57 and 66. Tape 73 is a bright light reflective adhesive strip that is extends about 180 degrees around each cup member 54 and 56. As shown in FIG. 9, when visual members 38 are in ON positions, tapes 73 are located adjacent lens 39 whereby the bright color of tapes 73 are visible by person 31. When visual members 38 are in the OFF position, shown in FIG. 11, tapes 73 are concealed within chamber 48. The black portions of visual members 38 are adjacent lens 39 and observed by person 31. The black portions of visual members 38 inform person 31 that the level of grain in bin chamber 23 is below the indicator.

As shown in FIG. 9 and 11, actuator 37 is operatively connected to visual members 38 with an arm 74 and a motion transmission assembly shown as a gear drive 76. A pin 77 pivotally mounts arm 74 on the inside end of support 49. The inner end 78 of arm 74 is threaded to accommodate a nut 79 that secures actuator 37 to arm 74. End 78 extends through a hole 81 in boot 34 whereby nut 79 clamps the inner end 82 of boot 34 to arm 74.

Gear drive 76 comprises a spur gear 83 mounted on shaft 64 and joined to disk 63 of visual member 54. The teeth of spur gear 83 mesh with a generally linear gear teeth or rack 84 on a guide member 86. Arm 74 has an outer end 87 that fits in a slot 88 in guide member 86. Guide member 86 has an oval ring 89 that rides in annular shoulders 91 and 92 on disks 63 and 72 that surround gear 83 to prevent the teeth of rack 84 from separating and becoming misaligned with the teeth of spur gear 83. Shoulders 91 and 92 also act as guides that keep the mesh between the teeth on rack 84 at optimum mesh tolerance. Disks 63 and 72 have cooperating teeth or projections 85 drivable connecting visual members 54 and 56 so that they concurrently rotate on rod 64. The top end of ring 86 controls the total movement of visual members 38 from the ON to OFF positions to a maximum of 180 degrees. End 87 of arm 74 has flat try sides that slide into slot 88 which has flat sides that match the shape of end 87 to prevent rack 84 and ring 89 from tipping and to track a straight 90 degrees against the teeth of spur gear 83.

Figure 18:
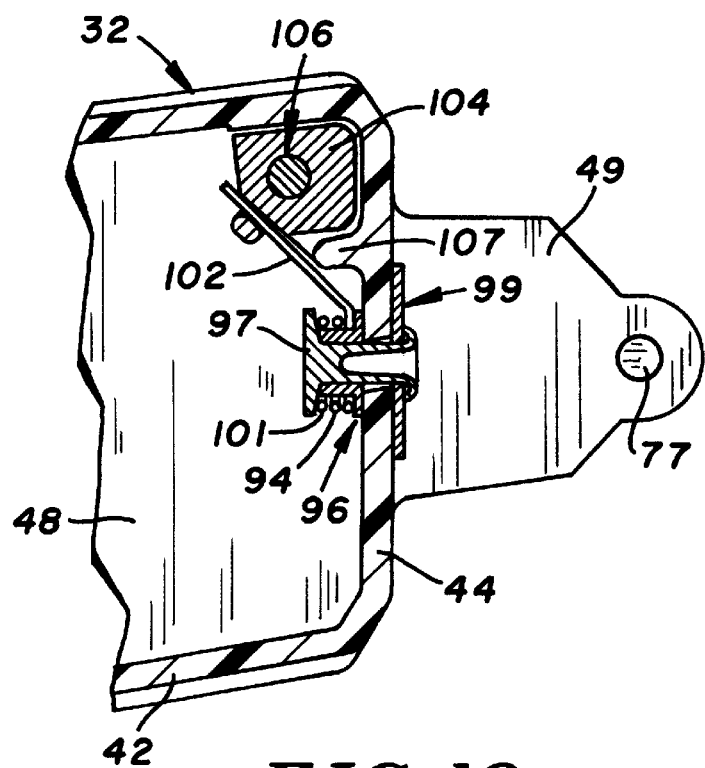
FIG. 18 is a sectional view taken along the line 18—18 of FIG. 17.

As shown in FIGS. 17 and 18, arm 74 is biased to a down OFF position with a spring 93. Spring 93 has a coil body 94 located around a sleeve 96. A rivet 97 extended through sleeve 96 and a hole 98 in back wall 44 is hooked over a washer 99 to retain sleeve 96 against back wall 44. Spring 93 has a first arm 101 extended from coil body 94 over arm 74 to bias arm 74 down, as shown in FIG. 11. Actuator 37 is located in its out or OFF position as bulk material is not present to force actuator 37 to the in or ON position. Spring 93 has a second arm 102 extended upwardly into a slot 103 in a nut 104. A thumb screw or threaded rod 106 accommodates nut 104. Nut 104 bears against a rib 107 to prevent nut 104 frame turning with rod 106. A head 108 joined to rod 106 is manually rotated to adjust the position of nut 104 on rod 106 thereby adjust the tension of coil body 94 and biasing force of spring arm 101 on arm 74. A lock nut 109 on the inside end of rod 106 holds rod 106 and nut 104 in their adjusted positions.

Spring 93, located within chamber 48, aids in the retraction of actuator 37 from the ON position to the OFF position. The tension of spring 93 is adjustable by turning thumb screw 106 to compensate for different types of actuators and to adjust for light and heavy bulk materials that are stored in bin chamber 23.

Actuator 37 has downwardly directed spring strap or bar 111 providing the main support for the actuator and the connection to arm 74. As shown in FIG. 9, bar 111 has a hole accommodating threaded end 78 of arm 74. Nut 79 holds bar 111 in tight engagement with end 82 of boot 34. Bar 111 is a rigid spring metal strap that provides strength vertically for the rest of the more pliable activator components. Bar 111 will spring back to it's original shape when the activator is used with heavy materials, such as sand and gravel. As shown in FIGS. 15 and 16, a flexible body 112 having a generally U-shaped cross section is attached to bar 111. Body 112 has a flat base 113 located between bar 111 and a plate 114. Rivets 116 retain bar 111 and plate 114 against opposite sides of base 113. Body 112 has side walls 117 and 118 joined to base 113 with live hinges 119 and 121 that allow side walls 117 and 118 to flex toward and away from each other. Generally flat lips 122 and 123 extended outwardly away from side walls 117 and 118 are joined to the outer edges of side walls 117 and 118 with live hinges 124 and 126. Hinges 124 and 126 curve outwardly to allow lips 122 and 123 to move toward the inside surface of bin wall 21. In one embodiment of the actuator the outer edges of lips 122 and 123 engage bin wall 21 when grain presses on the outside of body 112. The pressure of the grain on body 112 causes lips 112 and 123 to bend back adjacent bin side wall 21 and side walls 117 and 118 to move toward each other as shown by arrows 141 and 142 in FIG. 15. Live hinges 119, 121 and 124, 126 allow movement of side walls 117 and 118 and lips 122 and 123.

As shown in FIGS. 15 and 16, wings or flexible extensions 127 and 128 are secured to lips 122 and 123. Extensions 127 and 128 are flat flexible sheet members made from fiber reinforced rubber materials. The outer edges 129 and 131 of extensions remain against the inside surface of bin side wall 21 in both the ON and OFF positions to prevent bulk material from building up behind body 112. An accumulation of bulk material under body 112 will prevent complete movement of the actuator to the ON position. The body 112 and extensions 127 and 128 are sufficiently flexible to allow them to be rolled up to allow the actuator to be inserted from the outside through hole 36 in bin side wall 21. The bar 111 being made of spring steel insures the return of body 112 to its spread position as shown in FIG. 16. The biasing force of spring 93 is adjustable to maintain extensions 127 and 128 in contact with the inside surface of bin side wall 21 in both the ON and OFF positions of the activator. When the actuator is used without extensions 127 and 128, spring 93 is adjusted to hold the outer edges of lips 122 and 123 in engagement with bin side wall 21 in both ON and OFF positions of the actuator.

Figure 19:
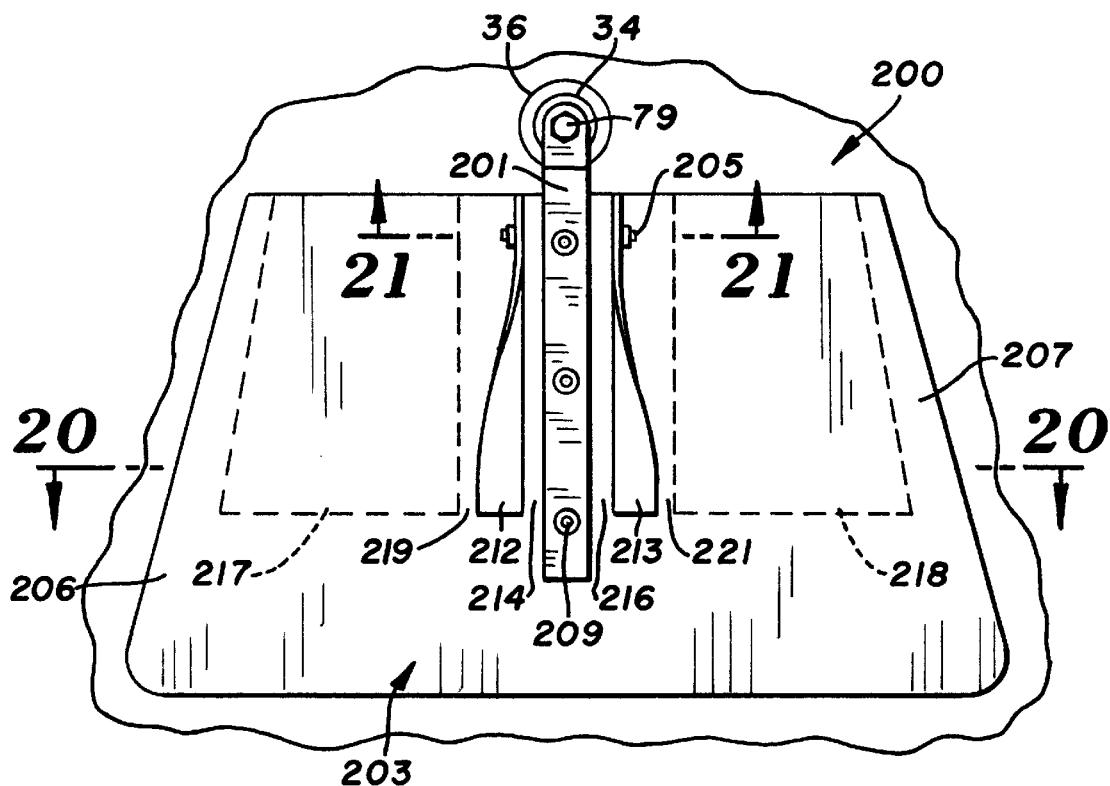
FIG. 19 is a plan view of a modification of an actuator connected to the arm of the indicator.
Figure 20:
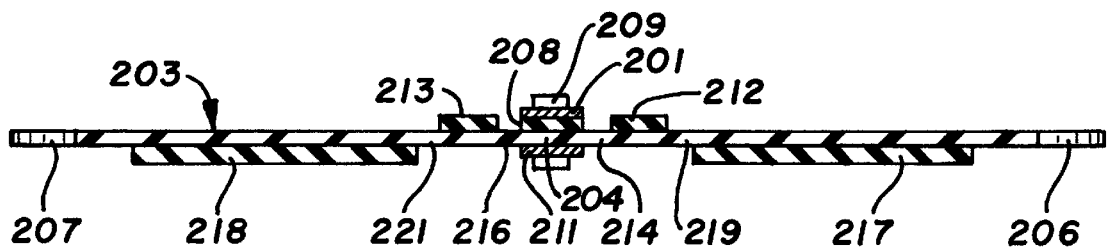
FIG. 20 is a sectional view taken along line 20—20 of FIG. 19.
Figure 21:
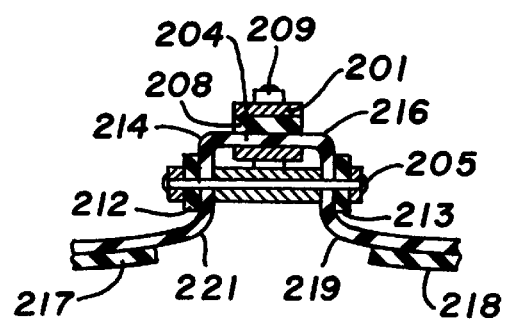
FIG. 21 is an enlarged sectional view taken along line 21—21 of FIG. 19.

A modification of the actuator, shown in FIGS. 19 and 20, is indicated generally at 200. Actuator 200 has a spring strap or bar 201 connected to the arm 74 with a nut 79 that also clamps the end 82 of boot 34 to the inner end of arm 74. Bar 201 provides strength vertically and a spring for the rest of the more pliable activator components. The flexing characteristics of bar 201 allows it to spring back to its original position when the activator is used with heavy materials, such as sand and gravel. A flexible body 203, shown as a sheet members, has a vertical center portion 204 secured to bar 201. Body 203 is a flexible fabric reinforced rubber sheet having opposite outer vertical sections or wings 206 and 207. A first vertical strip 208 of flexible material, such as neoprene rubber is joined to center portion 204. Rivets 209 clamp center portion 204 and strip 208 to bar 201 and a plate 211 to vertically support body 203 on bar 201. A pair of vertical flexible strips 212 and 213 of flexible rubber are attached to the outside surface of body 203 on opposite sides of bar 201. The strips 212 and 213 are laterally spaced from opposite sides of bar 201 providing body 203 with vertical hinge sections 214 and 216 that allow body 203 and strips 212 and 213 to fold toward each other in response to the pressure of bulk materials on the outside of actuator 200. As shown in FIG. 21, a rivet 205 holds the upper portion of strips 212 and 213 and body 203 in a generally U-shaped configuration. A pair of flexible plates or sheets 217 and 218 are secured to the outside surface of body 203 between strip 212 and wing 206 and strip 213 and wing 207. Plate 217 is laterally spaced from strip 212 providing body 203 with a vertical hinge section 219. Plate 218 is laterally spaced from strip 213 providing body 203 with another vertical hinge section 221. Hinge sections 219 and 221 allow wings 206 and 207 and body portions adjacent plates 217 and 218 to be moved adjacent the inside of the bin side wall 21 by bulk material acting against the activator 200. Plates 217 and 218 and strips 212 and 213 are relatively stiff rubber members which reinforce the body portions secured to these plates and strips.

In use as bulk material fills into the bin and starts making contact with activator 200, the pressure applied by the weight of the bulk material exerts an outward generally horizontal force greater than the minimum force required to activate the actuator. As the material fills into the bin and reaches the bottom edge of the activator the flexible bottom 203 bends slightly in response to the weight, creating the granular material to bridge and build-up on the outer side of the activator body. The sides 206 and 207 also are flexible and the weight of material builds up and pins the bottom corners against the bin wall creating an unobstructed area between the activator and the bin wall. At this initial stage when granular material first makes contact with the activator it is in the retracted OFF position as shown in FIG. 16. As the granular material continues to fill into the bin and build-up vertically on the activator the additional weight exerted by the material overwhelms the activator body and it collapses along the 4 hinge-like areas built into the activator 119, 121, 124 and 126 as shown in FIG. 15. The activator will continue to retain shape as in FIG. 15 as long as granular material continues to make contact with the activator. Semi-ridged areas 212, 213, 217 and 218 of FIG. 19 and 20, also 117, 118, 122 and 123 of FIG. 15 and 16, stiffen the activator body to transfer and amplify the outward force created by the granular material to the movement of the activator to its ON position as in FIG. 15. The spring steel strap members 111 and 114 converts the entire pressure collected by the surface of the activator to a movement towards the bin wall which in turn pivots the arm activating the indicator. The cylindrical cup shape of the visual members 54 and 56 with the bright color tape 73 allows the person 31 to view the indicator from the sides, above, below, and straight-on locations.

Figure 14:
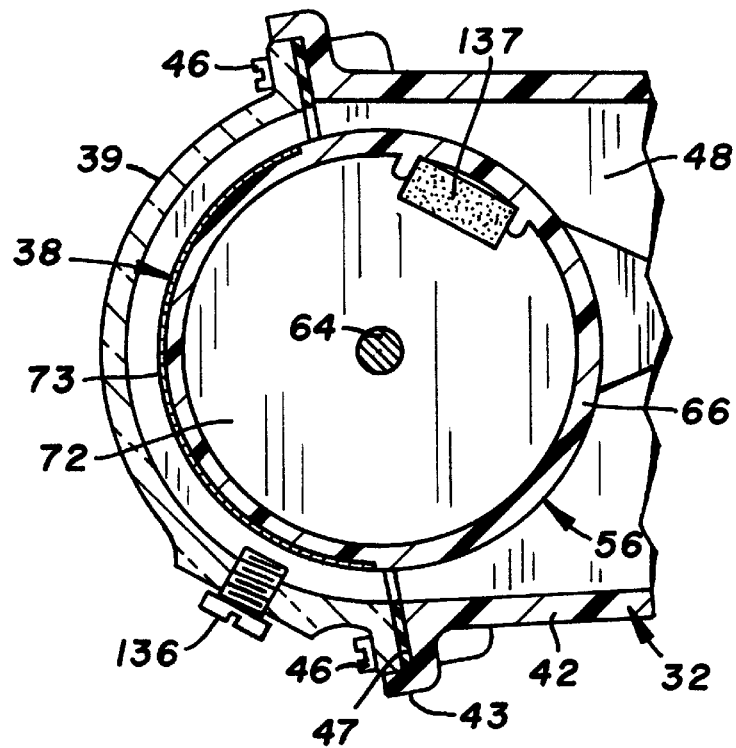
FIG. 14 is a sectional view taken along line 14—14 of FIG. 13.

Returning to FIG. 3, actuator 27 is connected to a remote indicator system 132 with a cable 133 and proximity sensor 134. The remote indicator system can be visual or audio signal devices that are activated when the visual indicators 38 are in the OFF position. As shown in FIG. 11 and 14, a magnet 137 is mounted on the inside of wall 66 of cup member 56. A metallic tape can be used in lieu of magnet 137. When cup member 56 is in the ON position, shown in FIG. 14, magnet 137 is diametrically opposite a plug 136 closing the threaded hole for the sensor 134. As shown in FIG. 11, when cup member 54 is in the OFF position magnet 137 is adjacent sensor 134. Magnet 137 operates to activate sensor 134 which signals the remote indicator system 132 when cup member 54 is in the OFF position. Sensor 134 includes an electric circuit having a magnetic actuated switch. Magnet 137 when moved adjacent sensor 134 triggers the switch which closes the circuit to remote indicator system 132. All of actuators 26–29 on bin side wall 21 can be equipped with sensors which electrically monitor the OFF position of the actuators. The operator in a remote location is provided with information concerning the level of bulk material in bin chamber 23. The remote indicator system 132 can include information storage computing and printing devices used to provide written dates of the level of bulk material in one or more grain storage bins.

Indicators 26–29 are installed from the outside of the bin 20 at selected levels, as shown for example in FIG. 1. Holes 36 are cut in bin wall 21 at the selected levels. For example the hole 36 has a 28 mm diameter to allow boot 34 and actuator 37 to be inserted though the hole. Actuator body 112 is rolled into a generally cylindrical configuration around bar 111. The rolled actuator is moved through hole 36 into bin chamber 23. When actuator 37 is free inside bin chamber 23 the rigid spring bar 111 and the memory of the rubber body 112 spreads the body adjacent the inside of bin wall 21. Spring 92 is adjusted to maintain a biasing force the keeps the outer edges of the actuator in contact with the inside of the bin side wall 21. Boot 34 is forced through hole 36 and retained in sealing relationship with bin wall 21 with nut and bolt assemblies 52 and 53 which are turned from the outside of bin 20. Body 32 is also attached to bin side wall 21 with bolts 33. The outer flange portion 51 of boot 34 between back wall 44 of body 32 and bin side wall 21 is also a seal preventing entrance of water, dust, snow, dirt and air into bin chamber 23.

Each indicator 26–29 can be used to provide visual and remote information of the level of a liquid in a tank or container storing liquid. The actuator 37 is replaced with a float which moves to an up position in a body of liquid and falls to a down position when the level of the liquid is below the float. An example of a float for the indicator is disclosed in U.S. Pat. No. 5,088,323, which is incorporated by reference. The float moves arm 74 between it's up and down positions thereby rotating the visual members 38 and 56 between ON and OFF positions. Visual and electrical sensor information relating to the level of the liquid in the tank is obtained from indicators 27–29 as described herein.

From the foregoing detailed description of the present invention it has been shown how the objects of the invention have been obtained in a preferred manner. However, modifications and equivalents of the disclosed concepts, such as those which readily occur to those skilled in the art, are intended to be included within the scope of this invention.

Thus, the scope of this invention is intended to be limited only by the scope of the claims which are, or which may hereafter by, appended hereto.

We claim:

1. An indicator for providing an indication of the level of material in a bin containing the material, said bin having a side wall with a hole for accommodating the indicator, comprising: a body, visual means having a generally cylindrically outer surface rotatably mounted on the body for movement between an ON position and an OFF position, a transparent member attached to the body enclosing the visual means within the body and transparent member, means having a bright color on a first portion of the cylindrical outer surface providing a visual indication of the ON position of the indicator, the remaining portion of the cylindrical outer surface having a dark color providing a visual indication of the OFF position of the indicator, a support on the body adapted to extend through the hole in the side wall of the bin, a flexible boot surrounding the support having an annular portion thereof adapted to engage the side wall of the bin, fastening means adapted to secure the body to the side wall of the bin and clamp the annular portion of the boot to the side wall of the bin, an arm, means pivoting the arm to the support for movement between first and second positions, motion transmitting means connecting the arm to the visual means operable to rotate the visual means between the ON and OFF positions in response to movement of the arm, actuator means connected to the arm adapted to be located within the bin for moving the arm to the first position when the material in the bin engages the actuator means and moving the arm to the second position when the material in the bin does not engage the actuator means whereby the arm operates the motion transmitting means which rotates the visual means between it's ON and OFF positions, and biasing means mounted on the body engageable with the arm for biasing the arm toward it's second position.

2. The indicator of claim 1 wherein: the body has side walls and a back wall, said visual means being pivotally mounted on the body side walls, said support being joined to the back wall.

3. The indicator of claim 1 wherein: said transparent member has a convex shape generally concentric with the cylindrical outer surface of the visual means, and means securing the transparent member to the body.

4. The indicator of claim 1 wherein: the body has side walls, said side walls and visual means having cooperating means pivotally mounting the visual means on the side walls for movement between the ON and OFF positions.

5. The indicator of claim 4 wherein: the cooperating means comprise pockets in said side walls of the body and a rod rotatably mounting said visual means located in said pockets to allow the visual means to rotate relative to the side walls of the body between the ON and OFF positions thereof.

6. The indicator of claim 1 wherein: the means having a bright color is a colored tape attached to about one half of the cylindrical outer surface of the visual means.

7. The indicator of claim 1 wherein: the motion transmitting means includes a rack having teeth connected to the arm, and a gear joined to the visual means, said teeth of the rack being engageable with the gear whereby movement of the arm rotates the visual means between it's ON and OFF positions.

8. The indicator of claim 7 including: a shoulder surrounding the gear, and, guide means connected to the rack engageable with the shoulder for maintaining the teeth of the rack in operative engagement with the gear.

9. The indicator of claim 1 wherein: the visual means includes a pair of cylindrical members said means having a bright color being on first portions of the cylindrical members.

10. The indicator of claim 9 wherein: the motion transmission means is located between the cylindrical members.

11. The indicator of claim 10 wherein: the motion transmitting means includes a rack having teeth connected to the arm, and a gear joined to the visual means, said teeth of the rack being engageable with the gear whereby movement of the arm rotates the visual means between it's ON and OFF positions.

12. The indicator of claim 11 including: shoulders on the cylindrical members surrounding the gear, and guide means connected to the rack engageable with the shoulders for maintaining the teeth of the rack in operative engagement with the gear.

13. The indicator of claim 1 wherein: the actuator means includes a bar, means connecting the bar to the arm, an actuator body connected to the bar, said actuator body having side walls with outer edges adapted to engage the side wall of the bin when the indicator is in both the ON and OFF positions.

14. The indicator of claim 1 wherein: the actuator means includes a bar, means connecting the bar to the arm, an actuator body having side walls, lips connected to the side walls of the actuator body with live hinges, and wing members attached to the lips, said wing members having outer edges adapted to engage the side wall of the bin when the indicator is in both the ON and OFF positions.

15. The indicator of claim 1 wherein: the actuator means includes a bar, means connecting the bar to the arm, a flexible sheet body having outer side edges adapted to engage the bin side wall when the indicator is in both the ON and OFF positions, means securing the body to the bar, a pair of flexible strip members secured to the body adjacent opposite sides of the bar, said strip members being spaced from the bar whereby the portions of the body between the bar and strip members comprise first hinge portions, a pair of plate members secured to the body adjacent outer edges of the strip members, said plate members being spaced from the strip members whereby the portions of the body between the strip members and plate members comprise second hinge portions, said first and second hinge portions of the body allowing the strip members and plate members to move relative to each other whereby the body collapses toward the in side wall in response to the material engaging the actuator.

16. The indicator of claim 1 including: a sensor attached to the indicator, remote indicator means connected to the sensor for providing information concerning the level of material in the bin, and means on the visual means operable to activate the sensor when the visual means is in the OFF position.

17. The indicator of claim 16 wherein: the means on the visual means is a magnet operable to trigger the sensor.

18. An indicator for providing an indication of the level of material in a bin containing the material, said bin having a side wall with a hole for accommodating the indicator, comprising: a body, visual means having an outer surface for indicating the level of the material in the bin, means rotatably mounting the visual means on the body for movement between an ON position and an OFF position indicating the level of the material in the bin, a transparent member attached to the body enclosing the visual means within the body and transparent member, means having a bright color on a first portion of the outer surface providing a visual indication of the ON position of the indicator, the remaining portion of the outer surface having a dark color providing a visual indication of the OFF position of the indicator, an arm, means pivotally mounting a first end portion of the arm on the body for movement between first and second positions, motion transmitting means connecting a second end portion of the arm to the visual means operable to rotate the visual means between the ON and OFF positions in response to generally upward and downward movement of the second end portion of the arm, and actuator means connected to the arm adapted to be located within the bin for moving the arm to the first position when the material in the bin engages the actuator means and moving the arm to the second position when the material in the bin does not engage the actuator means whereby the arm operates the motion transmitting means which rotates the visual means between its ON and OFF positions.

19. The indicator of claim 18 wherein: the body has side walls, said means rotatable mounting the visual means on the body having cooperating means on the side walls of the body and the visual means rotatably mounting the visual means on the side walls of the body for movement between the ON and OFF positions.

20. The indicator of claim 19 wherein: the cooperating means comprise pockets in said side walls of the body and a rod rotatably supporting said visual means located in said pockets to allow the visual means to rotate relative to the side wall of the body between the ON and OFF positions thereof.

21. The indicator of claim 18 wherein: the means having a bright color is a colored tape attached to about one half of the outer surface of the visual means.

22. The indicator of claim 18 wherein: the actuator means includes a bar, means connecting the bar to the arm, an actuator body connected to the bar, said actuator body having side actuator walls with outer edges adapted to engage the side wall of the bin when the indicator is in both the ON and OFF positions.

23. The indicator of claim 18 including: a sensor attached to the indicator, remote indicator means connected to the sensor for providing information concerning the level of the material in the bin, and means on the visual means operable to activate the sensor when the visual means is in the OFF position, said means on the visual mean is a magnet operable to trigger the sensor.

24. An indicator for providing an indication of the level of material in a bin containing the material, said bin having a side wall with a hole for accommodating the indicator, comprising: a body, visual means having an outer surface rotatable mounted on the body for movement between an ON position and an OFF position, a transparent member attached to the body enclosing the visual means within the body and transparent member, means having a bright color on a first portion of the outer surface providing a visual indication of the ON position of the indicator, the remaining portion of the outer surface having a dark color providing a visual indication of the OFF position of the indicator, an arm, means movably mounting the arm on the body for movement between first and second positions, motion transmitting means connecting the arm to the visual means operable to rotate the visual means between the ON and OFF positions in response to movement of the arm, and actuator means connected to the arm adapted to be located within the bin for moving the arm to the first position when the material in the bin engages the actuator means and moving the arm to the second position when the material in the bin does not engage the actuator means whereby the arm operates the motion transmitting means which rotates the visual means between its ON and OFF positions, the motion transmitting means includes a rack having teeth connected to the arm, and a gear joined to the visual means, said teeth of the rack being engageable with the gear whereby movement of the arm rotates the visual means between its ON and OFF positions.

25. The indicator of claim 24 including: a shoulder surrounding the gear, and guide means connected to the rack engageable with the shoulder for maintaining the teeth of the rack in operative engagement with the gear.

26. The indicator of claim 24 wherein: the visual means includes a pair of cylindrical members having cylindrical outer surfaces, said means having a bright color being on first portions of each cylindrical outer surface.

27. The indicator of claim 26 wherein: the motion transmission means is located between the cylindrical members.

28. The indicator of claim 26 including: shoulders on the cylindrical members surrounding the gear, and guide means connected to the rack engageable with the shoulders for maintaining the teeth of the rack in operative engagement with the gear.

29. The indicator of claim 24 wherein: the actuator means includes a bar, means connecting the bar to the arm, an actuator body connected to the bar, said actuator body having side walls with outer edges adopted to engage the side wall of the bin when the indicator is in both the ON and OFF positions.

30. The indicator of claim 24 including: the actuator means includes a bar, means connecting the bar to the arm, an actuator body having said walls, lips connected to the side walls of the actuator body with live hinges, and wing members attached to the lips, said wing members having outer edges adapted to engage the side wall of the bin when the indicator is in both the ON and OFF positions.

31. An indicator for providing an indication of the level of material in a bin containing the material, said bin having a side wall with a hole for accommodating the indicator, comprising: a body, visual means having an outer surface rotatably mounted on the body for movement between an ON position and an OFF position, a transparent member attached to the body enclosing the visual means within the body and transparent member, means having a bright color on a first portion of the outer surface providing a visual indication of the ON position of the indicator, the remaining portion of the outer surface having a dark color providing a visual indication of the OFF position of the indicator, an arm, means movably mounting the arm on the body for movement between first and second positions, motion transmitting means connecting the arm to the visual means operable to rotate the visual means between the ON and OFF positions in response to movement of the arm, and actuator means connected to the arm adapted to be located within the bin for moving the arm to the first position when the material in the bin engages the actuator means and moving the arm to the second position when the material in the bin does not engage the actuator means whereby the arm operates the motion transmitting means which rotates the visual means between its ON and OFF positions, the actuator means includes a bar, means connecting the bar to the arm, a flexible sheet body having outer side edges adapted to engage the bin side wall when the indicator is in both the ON and OFF positions, means securing the flexible sheet body to the bar, a pair of flexible strip members secured to the flexible sheet body adjacent opposite sides of the bar, said strip members being spaced from the bar whereby the portions of the flexible sheet body between the bar and strip members comprise first hinge portions, a pair of plate members secured to the flexible sheet body adjacent outer edges of the strip members, said plate members being spaced from the strip members whereby the portions of the flexible sheet body between the strip members and plate members comprise second hinge portions, said first and second hinge portions of the flexible sheet body allowing the strip members and plate members to move relative to each other whereby the flexible sheet body collapses toward the side wall of the bin inside wall in response to material engaging the actuator.

32. An indicator for providing an indication of the level of material in a bin containing the material, said bin having a side wall with a hole for accommodating the indicator, comprising: a body, first means for indicating the level of the material in the bin means rotatably mounting the first means on the body for rotation between an ON position and an OFF position, a member attached to the body enclosing the first means within the body and member, an arm, second means pivoting a first end portion of the arm to the body for movement between first and second positions, motion transmitting means connecting a second portion of arm to the first means operable to rotate the first means between the ON and OFF positions in response to generally upward and downward movement of the second end portion of the arm, actuator means connected to the arm adapted to be located within the bin for moving the arm to the first position when the material in the bin engages the actuator means and moving the arm to the second position when the material in the bin does not engage the actuator means whereby the arm operates the motion transmitting means which rotates the first means between its ON and OFF positions, a sensor attached to the indicator, remote indicator means connected to the sensor for providing information concerning the level of the material in the bin, and means on the first means operable to activate the sensor when the first means is in the OFF position.

33. The indicator of claim 32 wherein: the means on of first means is a magnet operable to trigger the sensor.

34. An indicator for providing an indication of the level of material in a bin containing the material, said bin having a side wall with a hole for accommodating the indicator, comprising: a body, first means having an outer surface rotatably mounted on the body for movement between an ON position and an OFF position, a member attached to the body enclosing the first means within the body and member, an arm, second means pivoting the arm to the body for movement between first and second positions, motion transmitting means connecting the arm to the first means operable to rotate the first means between the ON and OFF positions, in response to movement of the arm, actuator means connected to the arm adapted to be located within the bin for moving the arm to the first position when material in the bin engages the actuator means and moving the arm to the second position when the material in the bin does not engage the actuator means whereby the arm operates the motion transmitting means which rotates the first means between its ON and OFF positions, a sensor attached to the indicator, remote indicator means connected to the sensor for providing information concerning the level of the material in the bin, and means on the first means operable to activate the sensor when the first means is in the OFF position, the motion transmitting means includes a rack having teeth connected to the arm, and a gear joined to the first means, said teeth of the rack being engageable with the gear whereby movement of the arm rotates the first means between its ON and OFF positions.

35. The indicator of claim 34 including: a shoulder surrounding the gear, and guide means connected to the rack engageable with the shoulder for maintaining the teeth of the rack in operative engagement with the gear.

* * * * *